United States Patent Office 2,811,561
Patented Oct. 29, 1957

2,811,561

PREPARATION OF VITAMIN A ALDEHYDE

George L. Fletcher, Rochester, N. Y., assignor to Eastman Kodak Company, Rochester, N. Y., a corporation of New Jersey No Drawing. Application April 22, 1954,
Serial No. 425,031

11 Claims. (Cl. 260—598)

This invention relates to methods of making vitamin A aldehyde and is particularly concerned with the conversion of a hydroxy vitamin A acetal to vitamin A aldehyde.

Vitamin A aldehyde is a valuable compound in the manufacture of synthetic vitamin A, since it possesses high vitamin A activity itself and also is readily reduced to vitamin A alcohol by well-known reduction methods such as Meerwein-Ponndorf reduction with aluminum alkoxide and alcohol or the reduction with an ether-soluble metal hydride or similar method of reducing olefinic aldedyes to the corresponding alcohol. Vitamin A alcohol is, of course, readily esterified by known methods to form the acetate, palmitate or similar well-known ester, vitamin A usually being sold commercially in the ester form.

In the synthesis of vitamin A, either or both of the Reformatsky and Grignard type reactions are useful in building up the requisite skeletal molecular structure of vitamin A. Both reactions yield a hydroxy compound, however, and dehydration is necessary to attain vitamin A-active material. In the case of the polyenes of the vitamin A series, dehydration usually results in a substantial amount of concomitant isomerization whereby a large proportion of product is an isomeric compound rather than the desired vitamin A.

Among the potential vitamin A intermediates, the hydroxy polyene acetals possessing the carbon skeleton of vitamin A and hereinafter referred to for brevity as hydroxy vitamin A acetals, are very valuable intermediates since they can be prepared in good yield by a variety of methods. Such hydroxy vitamin A acetals include both the monohydroxy vitamin A acetals and the dihydroxy vitamin A acetals (referred to for convenience as vitamin A diol acetals), both cyclic and open acetals, and compounds having an unsaturated structure isomeric to the α,β-unsaturated completely conjugated vitamin A structure.

It is accordingly an object of this invention to provide a new method of making vitamin A aldehyde.

It is a further object of this invention to provide an effective method of converting hydroxy polyene acetals having the carbon skeleton of the vitamin A molecule to vitamin A aldehyde in high yield.

Another object of the invention is to convert hydroxy vitamin A acetals to vitamin A aldehyde without objectionable yield losses due to isomerization.

Another object of the invention is to provide a method of converting hydroxy vitamin A acetals to vitamin A aldehyde in a single reaction mixture.

Another object of the invention is to dehydrate and hydrolyze hydroxy vitamin A acetals to vitamin A aldehyde in a single reaction step.

Another object of the invention is to facilitate vitamin A syntheses involving a Reformatsky or Grignard reaction which produces a hydroxy vitamin A acetal.

Another object of the invention is to dehydrate and hydrolyze vitamin A diol acetal to vitamin A aldehyde in good yield.

Another object of the invention is to provide a new method which minimizes the yield losses normally attendant to converting a hydroxy vitamin A compound to vitamin A-active material.

Another object of the invention is to convert vitamin A 3,7-diol acetal to vitamin A aldehyde in a single reaction step.

Another object of the invention is to provide a method which accomplishes in a single step a conversion which normally would involve a plurality of steps with an attendant lowered yield due to multiple reactions, isolations and handlings.

Other objects will be apparent from the description and claims which follow.

These and other objects are attained by means of this invention as described more fully hereinafter with reference to certain preferred embodiments, the method embodying the invention comprising treating a hydroxy polyene acetal having the carbon skeleton of vitamin A with a halogen acid in an organic solvent for the acid and acetal and thereby, in a single reaction mixture, converting such hydroxy vitamin A acetal to vitamin A aldehyde in a single step.

The hydroxy polyene acetals having the carbon skeleton of vitamin A, and herein called hydroxy vitamin A acetals, include both monohydroxy and dihydroxy acetals and both cyclic and open acetals, the dialkyl acetals being conveniently employed. Typical vitamin A diol acetals include the 3,7 diol of the formula

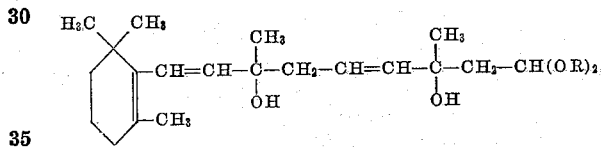

Compound I wherein R is an alkyl group in an open acetal for purposes of illustration; the 3,6 diol of the formula

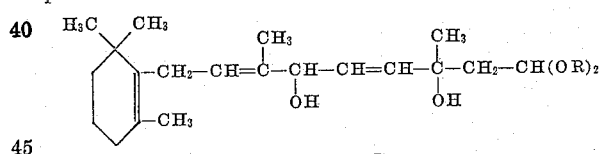

Compound II and the 3,5 diol of the formula

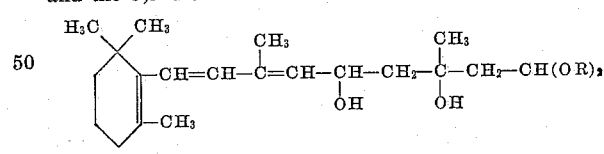

Compound III

Typical monohydroxy vitamin A acetals include the 3-hydroxy compound of the formula

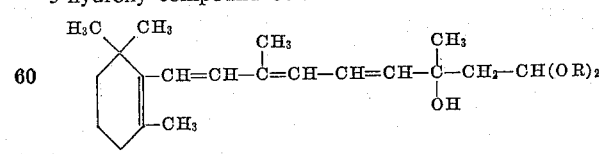

Compound IV or its 3-hydroxy desmotropic isomer of the formula

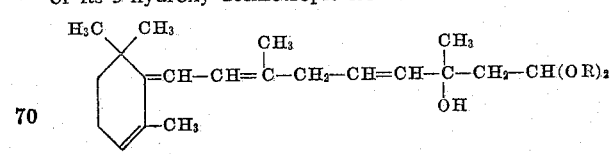

Compound V as well as the 7-hydroxy compound of the formula

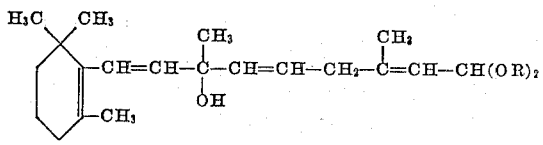

Compound VI and similar hydroxy vitamin A acetals. Isomers of these hydroxy vitamin A acetals are similarly converted to isomers of vitamin A aldehyde and are included in the invention as defined herein.

The hydroxy vitamin A acetals can be prepared in a number of ways. Thus, for example, Compound I can be prepared by condensing β-ionone with propargyl bromide in the presence of zinc to form a propinyl carbinol, condensing the propinyl carbinol with a di-alkyl acetal of β-ketobutyraldehyde by means of a Grignard reaction and subjecting the resulting condensation product to partial hydrogenation with a molecular equivalent of hydrogen in the presence of a palladium catalyst to reduce the acetylenic linkage to an olefinic linkage and thereby obtain Compound I.

Compound II is readily prepared by reacting a dialkyl acetal of β-ketobutyraldehyde with sodium acetylide in liquid ammonia, subjecting the resulting product to a Grignard reaction with the C14-aldehyde, 4-(2,6,6-trimethyl cyclohexen-1-yl)-2-methyl-but-2-ene-1-al, and partially hydrogenating the condensation product thereby obtained to form the 3,6-diol, Compound II.

Compound III can be prepared by reacting β-ionylidene acetaldehyde with methyl magnesium bromide, oxidizing the resulting carbinol to a carbonyl compound and condensing the carbonyl compound with 4,4-dialkoxy-2-butanone by means of sodium methylate, and reducing the hydroxy keto vitamin A acetal thus obtained to Compound III. This method is cumbersome, however, and β-ionylidene acetaldehyde is preferably employed for making Compound IV. Compound IV is prepared by reacting β-ionylidene acetaldehyde with a dialkyl acetal of β-ketobutyraldehyde in the presence of sodium methylate and reacting the resulting product with methyl magnesium bromide.

Compound V can be prepared by a process similar to that employed for preparing Compound I. β-ionone is condensed with propargyl bromide in the presence of zinc to form an ethinyl carbinol which is then dehydrated with hydrochloric acid in methyl alcohol. A substantial proportion of the dehydration occurs by splitting out of a ring hydrogen to give cyclohex-2-ene-1-ylidenic compound which is thereafter carried through the process employed with Compound I, thus giving Compound V as a product. That portion of the propinyl carbinol which dehydrates in the side chain can be carried through the same process to give Compound IV. A mixture of Compound IV and Compound V can also be prepared by treating Compound I with thionyl chloride and pyridine whereby the 7-hydroxy group splits off leaving the 3-hydroxy group largely intact.

Compound VI can be prepared by condensing propargyl bromide with a dialkyl acetal of β-ketobutyraldehyde in the presence of zinc, dehydrating the resulting condensation product, subjecting the dehydrated product to a Grignard reaction with β-ionone, and partially hydrogenating the acetylenic linkage to give Compound VI.

The hydroxy vitamin A acetals are largely devoid of vitamin A biological activity but possess the requisite skeletal carbon structure. In order to obtain vitamin A-active material, it is necessary to dehydrate hydroxy vitamin A compounds which usually causes concomitant formation of a major proportion of a cyclohex-2-ene-1-ylidenic isomer of vitamin A. In the process embodying this invention, however, dehydration of the hydroxy compounds and hydrolysis of the acetal group is effected in a single reaction step to give vitamin A aldehyde or an isomer thereof if an isomeric hydroxy acetal is used. The exact mechanism by which the conversion occurs is not known since the conversion takes place without isolation of any intermediate products.

Employing Compound I for purposes of illustration, the process embodying the present invention can be illustrated graphically as follows:

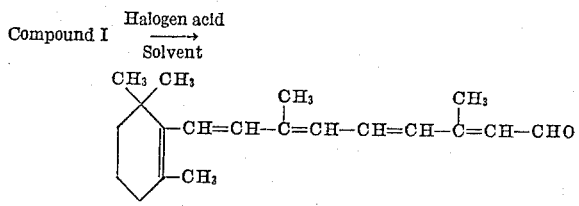

The conversion of other hydroxy vitamin A acetals to vitamin A aldehyde proceeds in similar fashion in a single reaction mixture employing the process embodying the present invention.

In practicing the invention, the hydroxy vitamin A acetal is treated with a halogen acid in a solvent in which the reactants are at least partially soluble and in which the reaction products, including any intermediate products, are completely soluble. The reason why the reaction proceeds in the desired manner without the formation of unwanted isomers and by-products is not understood although the reaction appears to proceed by formation of an intermediate compound of unknown nature which must be soluble in the organic solvent in order for the reaction to proceed to completion.

In order for the reaction to proceed in accordance with this invention, it is necessary that halogen acid and hydroxy vitamin A acetal be mutually dissolved in the solvent together with the reaction products as they are formed. Thus, the reaction phase desirably should be homogeneous, and the reaction system desirably should contain no separate aqueous phase; since, under such conditions, the halogen acid tends to concentrate in the aqueous phase and the reaction rate may be slowed very materially. It is not necessary, however, that the reaction phase be completely anhydrous and at least a trace of water is necessary initially for optimum conversion, water being subsequently added to the reaction phase by dehydration of the hydroxy vitamin A acetal. The solvent can contain water dissolved therein up to the concentration at which the hydroxy vitamin A acetal is thrown out of solution or the water begins to form a separate phase. Extra amounts of water often may be homogenized with the reaction solution by agitation or similar treatment without objectionable results and even larger amounts, sufficient to form a distinct separate phase, are not absolutely excluded provided care is exercised to maintain the proper concentration of acid in the solvent or reaction phase of the mixture.

The acid employed in practicing the invention is a halogen acid such as hydrochloric acid, hydrobromic acid, hydriodic acid or the like, and the acid can be added to the reaction mixture in the form of the aqueous acid, or as the acid gas such as hydrogen chloride, hydrogen bromide, hydrogen iodide or the like, or can be formed in situ by addition of a halogen acid such as trichloracetic acid. Other acids such as non-halogen mineral acid or organic acids are not suitable for use in this process. The acid concentration must be above 0.02% by weight of acid based on the weight of hydroxy vitamin A acetal and is preferably at least 0.2% by weight based on the hydroxyacetal weight. Any concentration of acid above this minimum concentration up to the limit of solubility of the acid in the solvent can be employed without adversely affecting the course of the reaction. This is in marked contrast to fully aqueous systems wherein highly concentrated acids degrade the vitamin A materials themselves.

In effecting the reaction, any organic solvent can be employed which acts as a mutual solvent for the halogen acid, the hydroxy vitamin A acetal, and the reaction products including intermediates formed during the course of the reaction. This includes the polar solvents and the halogenated hydrocarbons which can suitably be used, the paraffinic hydrocarbons being unsuitable for use in the process. Among the solvents which are particularly effective are the ketones such as methyl ethyl ketone, diethyl ketone and the like, the alcohols such as isopropyl alcohol and the like, the halogenated lower alkanes such as chloroform, carbon tetrachloride, trichloroethane and the like, although ethers such as diethyl ether and other well-known polar solvents can be used with good results. The solvent is used in an amount of at least one part by weight of solvent to each part of hydroxy vitamin A acetal with larger amounts of solvent such as 5, 10, 50 or 100 times the weight of hydroxy vitamin A acetal being desirably employed. Although the solvent must at least equal the weight of hydroxy vitamin A acetal, any larger amount can be used limited only by practical considerations of volume with respect to yield of product.

The conversion in accordance with this invention is carried out at a temperature below 200° C. and the temperature employed in the range below 200° C. will depend upon the acid concentration in the reaction phase and the time employed for effecting the conversion. The conversion can be effected in a few minutes under optimum conditions and may range up to several hours under less favorable conditions. Generally, when temperatures are raised toward the 200° C. maximum, the concentration of acid is minimized to avoid objectionable side reactions.

The reaction can be carried out at atmospheric pressure and at or below the reflux temperature of the reaction phase, or it can be carried out in a closed system at temperatures above the normal boiling temperature of the solvent. Following the reaction, the vitamin A aldehyde product, which is obtained in excellent yield, can be separated from the reaction mixture in any well-known manner. Preferably, the reaction mixture is neutralized, the solvent removed by evaporation, and the residue containing the aldehyde worked up in the usual way by washing, extraction or the like. The product can be further purified by distillation, chromatography or the like if desired.

The process of the invention produces vitamin A aldehyde in high yield without objectionable isomerization, by-product formation, or charring or degradation of the vitamin A material. This appears to be due at least in part to the concomitant hydrolysis of the acetal group and dehydration to remove the hydroxyl group or groups under the reaction conditions, possibly with the formation of intermediates during the course of the reaction. The fact that the conversion probably proceeds by a complex reaction mechanism is indicated by the precipitation of a material of unknown composition from paraffinic hydrocarbons when the conversion is attempted therein whereby the reaction does not proceed to vitamin A aldehyde as in the present invention. This is further indicated by the fact that other ionizable acids, such as sulfuric acid or acetic acid, which might be expected to effect hydrolysis alone or dehydration alone, are ineffective in effecting the interrelated reactions which appear to combine to give the present conversion. It thus appears that the process of this invention is not merely two distinct and separate reactions proceeding independently of each other in a single reaction system but a particular reaction relationship which produces the desired result in a greatly improved yield over the reactions effected separately. Since the mechanism is not readily understood and since the conversion proceeds under the defined conditions regardless of any theory which might be advanced by way of explanation, it will be understood that the invention is not intended to be limited by any theory advanced by way of explanation and that the invention is of the scope as defined herein and in the claims.

The invention is illustrated by the following examples of typical embodiments which are included to illustrate the best mode of practicing the invention and not to limit the invention unless otherwise specifically indicated.

Example 1

To a solution of 10.7 g. of vitamin A 3,7-diol dimethyl acetal in 60 ml. of methyl ethyl ketone was added 0.124 g. of hydrogen chloride in 0.218 g. of water. The resulting reaction solution was then heated at 79.6° C. for 60 minutes. The vitamin A aldehyde formed by conversion of the hydroxy vitamin A acetal was then recovered by diluting the reaction mixture with ether, and washing out the acid with water. The neutral reaction mixture was then concentrated by evaporating off the solvent leaving a vitamin A aldehyde concentrate having $$E_{1\,cm.}^{1\%}(370\ m\mu) = 784$$

a yield of aldehyde in the single step conversion of 60.6%.

Example 2

A solution of 0.89 g. of the hydroxy vitamin A acetal, vitamin A 3,7-diol dimethyl acetal, 0.00355 g. of hydrogen chloride and 0.0064 g. of water in 20 ml. of methyl ethyl ketone was heated at 150° C. for one hour. The resulting reaction product was worked up by diluting the reaction mixture with hexane, washing out the acid by means of repeated water washes, and removing the solvent under vacuum. The vitmain A aldehyde concentrate thereby obtained had $$E_{1\,cm.}^{1\%}(370\ m\mu) = 644$$

and the yield of aldehyde was 40%.

Example 3

A solution of 1.78 g. of vitamin A 3,7-diol dimethyl acetal, 0.0071 g. of hydrogen chloride and 0.0128 g. of water in 40 ml. of methyl ethyl ketone was heated at 150° C. for 60 minutes. The product was worked up as described in the preceding examples to give a 59.8% yield of vitamin A aldehyde in the form of a dark oily concentrate having $$E_{1\,cm.}^{1\%}(370\ m\mu) = 700$$

Example 4

A reaction solution consisting of 10.7 g. of vitamin A 3,7-diol dimethyl acetal, 0.128 g. of hydrogen chloride, 0.231 g. of water and 60 ml. of chloroform was heated at 61° C. for one hour. The vitamin A aldehyde product, after working up, represented a yield of 51% and had $$E_{1\,cm.}^{1\%}(370\ m\mu) = 623$$

Example 5

A reaction solution of 10.7 g. of vitamin A 3,7-diol dimethyl acetal, 0.128 g. of hydrogen chloride, 0.231 g. of water and 30 ml. of methyl ethyl ketone was heated at reflux for one hour. Vitamin A aldehyde was obtained in a yield of 70.6% in a concentrate having $$E_{1\,cm.}^{1\%}(370\ m\mu) = 822$$

Example 6

In the preceding examples, the halogen acid was added in the form of a concentrated aqueous solution. The conversion can be effected by bubbling in hydrogen halide gas in the requisite amount, however, without the addition of any water except for the traces normally present in the reactants. Thus, 0.128 g. of hydrogen chloride gas was dissolved in a solution of 10.7 g. of vitamin A 3,7-diol acetal in 30 ml. of methyl ethyl ketone, and the resulting reaction solution was refluxed for one hour. The conversion of hydroxy vitamin A acetal to vitamin A aldehyde was 59% and the product had $$E_{1\,cm.}^{1\%}(370\ m\mu) = 763$$

Example 7

The use of larger amounts of water does not deleteriously affect the course of the reaction particularly when such water remains dissolved in the reaction phase. Thus, a solution consisting of 10.7 g. of vitamin A 3,7-diol dimethyl acetal, 0.131 g. of hydrogen chloride, 6.237 g. of water and 60 ml. of methyl ethyl ketone after refluxing for one hour gave a conversion of 62.3% of hydroxy vitamin A acetal to vitamin A aldehyde.

*Example 8*

The acid concentration can also be varied as defined herein without adverse effect. A solution of 10.7 g. of vitamin A 3,7-diol dimethyl acetal, 0.066 g. of hydrogen chloride in 0.118 g. of water, and 28.3 ml. of methyl ethyl ketone was refluxed for one hour to give a 65.5% yield of vitamin A aldehyde.

*Example 9*

Hydroxy vitamin A acetal was converted to vitamin A aldehyde in a yield of 72.5% by heating at 79.6° C. for one hour a solution of 10.7 g. of vitamin A 3,7-diol dimethyl acetal, 0.128 g. of hydrogen chloride (as concentrated hydrochloric acid) and 0.231 g. of water in 60 ml. of methyl ethyl ketone. The vitamin A aldehyde concentrate had $$E_{1cm}^{1\%}(370\ m\mu) = 859$$

*Example 10*

A 67.3% yield of vitamin A aldehyde resulted from refluxing 12.0 g. of vitamin A 3,7-diol dimethyl acetal with 0.128 g. of hydrogen chloride in 60 ml. of methyl ethyl ketone containing 0.231 g. of water. Similar results are obtained with other acetals such as the diethyl acetal and other lower alkyl acetals or cyclic acetals with hydrogen bromide or hydrogen iodide as well as hydrogen chloride.

*Example 11*

Best results are obtained with relatively dilute reaction mixtures in which the concentration of reactants per unit volume is reduced. A solution of 8.9 g. of vitamin A 3,7-diol dimethyl acetal in 310 ml. of methyl ethyl ketone to which was added 0.128 g. of hydrogen chloride and 0.231 g. of water gave a vitamin A aldehyde yield of 82.3% after refluxing for 60 minutes. The product concentrate had $$E_{1cm}^{1\%}(370\ m\mu) = 980$$

The position of the hydroxyl group on the side chain does not affect the course of the reaction, and other diol acetals such as vitamin A 3,6-diol acetal and monohydroxy acetals as described are converted in similar fashion.

*Example 12*

As has been described, any of the solvents in which both reactants and products are soluble can be used for effecting the conversion process. Thus, 1.78 g. of vitamin A 3,7-diol acetal was dissolved in 100 ml. of isopropyl alcohol and 0.355 g. of hydrogen chloride gas was added. After only 7.5 minutes at 40° C., a 43% yield of vitamin A aldehyde was obtained. Other alcohols such as methyl alcohol and ethyl alcohol, other ketones such as acetone and dimethyl ketone and other polar solvents as well as such halogenated solvents as carbon tetrachloride give similar results in the process of the invention.

Similar results are obtained in converting other hydroxy vitamin A acetals as described using these or other conditions as defined herein. Although the lower dialkyl acetals are usually formed for convenience, any of the dialkyl acetals can be converted since the nature of the acetal group does not affect the course of the reaction. The invention thus provides a simple method for effecting conversion of hydroxy vitamin A acetals to vitamin A aldehyde in high yield and without objectionable isomerizations, side reactions, degradation of product and the like. Any of the other polar or halogenated alkane solvents can be used with satisfactory results under the conditions defined herein. The ratio of halogen acid to hydroxy vitamin A acetal can be varied widely without adverse effect. Thus, at reflux temperatures and atmospheric pressure, the ratio of halogen acid to hydroxy vitamin A acetal can readily be varied from about 20:1 to 1:90 under practical operating conditions for commercial operations as calculated on a weight basis of concentrated aqueous acid, while at elevated pressures and temperatures of 100–200° C. the acid to acetal ratio is desirably from 1:100 to 1:600. Statements herein respecting acid concentrations all must be understood as having reference to the concentration of acid in the solvent or reaction phase. Any additional amounts of acid which may be present in a separate aqueous phase, if such exists, are not included.

When a halogenated alkane is employed as a solvent, the solvent itself contributes to the conversion and lesser amounts of halogen acid can be employed under the same conditions as when using an unhalogenated polar solvent. The solvent desirably possesses a sufficient solvent action to dissolve all of the halogen acid added to the reaction system and must dissolve a sufficient amount to give the minimum acid concentration necessary for conversion of the hydroxy vitamin A acetal as described. The solvents which have a strong affinity for the halogen acid, such as the ketones and alcohols, are preferred for optimum conversion efficiency.

Although the invention has been described in detail with particular reference to certain typical embodiments, it will be understood that variations and modifications can be effected within the spirit and scope of the invention as described hereinabove and as defined in the appended claims.

I claim:

1. The method of converting hydroxy vitamin A acetal to vitamin A aldehyde in a single reaction step which comprises treating a hydroxy vitamin A acetal at an elevated temperature below 200° C., with a solution containing at least 0.02% by weight based on the acetal of a halogen mineral acid in an organic solvent capable of dissolving both the reactants and the reaction products during the reaction and selected from the group consisting of polar solvents and halogenated alkanes, the amount by weight of said solvent being at least equal to the amount of said hydroxy vitamin A acetal, said converting being carried out in a reaction mixture initially containing said solution together with at least a trace of water, whereby dehydration and hydrolysis are effected in correlation to produce vitamin A aldehyde.

2. The method of effecting correlated and concomitant hydrolysis and dehydration of hydroxy vitamin A acetal to form vitamin A aldehyde in a single reaction step which comprises treating hydroxy vitamin A acetal with a halogen mineral acid at an elevated temperature below 200° C. in solution in an organic solvent in which the reactants and reaction products are soluble under the reaction conditions and selected from the group consisting of polar solvents and halogenated lower alkanes, the reaction solution containing water effective to initiate the reaction under the reaction conditions, the weight of said solvent being substantially in excess of the weight of said hydroxy vitamin A acetal, said halogen acid in the reaction solution amounting to at least about 0.2% by weight based on the weight of said hydroxy vitamin A acetal.

3. The method of making vitamin A aldehyde by correlated and concomitant hydrolysis and dehydration of hydroxy vitamin A acetal in a single reaction mixture which comprises treating hydroxy vitamin A acetal with a halogen mineral acid in a ketonic solvent at an elevated temperature below 200° C., said solvent containing at least a trace of water to initiate the conversion, said halogen acid in the solvent phase amounting to at least about 0.2% by weight based on the weight of said hydroxy vitamin A acetal, said solvent amounting to an excess by weight over the weight of said hydroxy vitamin A acetal, the reactants and reaction products being soluble in said solvent during the reaction.

4. The method of making vitamin A aldehyde by correlated conversion of vitamin A diol acetal under controlled reaction conditions in a single reaction mixture which comprises dissolving vitamin A diol acetal in a substantial excess by weight of an organic solvent capable of dissolving both the reactants and reaction products during the reaction and selected from the group consisting of polar solvents and halogenated lower alkanes, and converting said vitamin A diol acetal to vitamin A aldehyde in solution in said solution by means of hydrochloric acid present in said solution in an amount of at least about 0.2% by weight of hydrogen chloride based on the weight of said vitamin A diol acetal, said converting being effected at a temperature in the range from about the reflux temperature of said solvent to 200° C. and in the presence of water in an amount which is substantially completely soluble in said solvent under the reaction conditions.

5. The method of converting vitamin A 3,7-diol acetal to vitamin A aldehyde by correlated and concomitant hydrolysis and dehydration which comprises heating to an elevated temperature below 200° C. a solution of vitamin A 3,7-diol acetal in a ketone capable of dissolving both the reactants and the reaction products during the reaction and containing dissolved therein at least about 0.2% by weight of hydrogen chloride and water in an amount sufficient to catalyze the conversion, said ketone being substantially in excess of the amount necessary to dissolve said vitamin A 3,7-diol acetal.

6. The method which comprises dissolving in methyl ethyl ketone an amount of vitamin A 3,7-diol acetal substantially less than the weight of said ketone and aqueous hydrochloric acid in an amount which is completely soluble in said ketone and sufficient to provide at least 0.2% by weight of dissolved hydrogen chloride based on the weight of said vitamin A 3,7-diol acetal, and heating the resulting solution to a temperature from about the reflux temperature of said ketone to 200° C. for a time sufficient to effect conversion of a substantial portion of said vitamin A 3,7-diol acetal to vitamin A aldehyde by concomitant and correlated hydrolysis and dehydration, the reactants and the reaction products being soluble in said ketone during the reaction.

7. The method which comprises dissolving vitamin A 3,7-diol acetal and hydrogen chloride gas in methyl ethyl ketone containing water in an amount not substantially above the saturation point of said ketone, said solvent amounting to a substantial excess by weight over said vitamin A 3,7-diol acetal, said hydrogen chloride being dissolved in an amount of at least about 0.2% by weight of the weight of said vitamin A 3,7-diol acetal, and heating the resulting solution to an elevated temperature below 200° C. for a time sufficient to effect conversion of a substantial portion of said vitamin A 3,7-diol acetal to vitamin A aldehyde by correlated, concomitant hydrolysis and dehydration, the reactants and the reaction products being soluble in said ketone during the reaction.

8. The method which comprises forming a reaction solution of vitamin A 3,7-diol acetal, hydrogen chloride, water and a solvent comprising a lower alkyl alcohol wherein the solvent is in substantial excess over the weight of vitamin A 3,7-diol acetal and the hydrogen chloride amounts to at least about 0.2% of the weight of said vitamin A 3,7-diol acetal, and heating the reaction solution to an elevated temperature below 200° C. for a time sufficient to effect conversion of a substantial portion of said vitamin A 3,7-diol acetal to vitamin A aldehyde by concomitant and correlated hydrolysis and dehydration, the reactants and the reaction products being soluble in said solvent during the reaction.

9. The method which comprises forming a reaction solution of vitamin A 3,7-diol acetal, hydrogen chloride, water and a solvent comprising a halogenated lower alkane wherein the solvent is in substantial excess over the weight of vitamin A 3,7-diol acetal and the hydrogen chloride amounts to at least about 0.2% of the weight of said vitamin A 3,7-diol acetal, and heating the reaction solution to an elevated temperature below 200° C. for a time sufficient to effect conversion of a substantial portion of said vitamin A 3,7-diol acetal to vitamin A aldehyde by concomitant and correlated hydrolysis and dehydration, the reactants and the reaction products being soluble in said solvent during the reaction.

10. The method which comprises forming a homogeneous solution of vitamin A 3,7-diol acetal, hydrogen chloride, water and a solvent comprising isopropyl alcohol wherein the solvent is in substantial excess over the weight of vitamin A 3,7-diol acetal and the hydrogen chloride amounts to at least about 0.2% of the weight of said vitamin A 3,7-diol acetal, and heating the solution to an elevated temperature below 200° C. for a time sufficient to effect conversion of a substantial portion of said vitamin A 3,7-diol acetal to vitamin A aldehyde by concomitant and correlated hydrolysis and dehydration, the reactants and the reaction products being soluble in said solvent during the reaction.

11. The method which comprises forming a homogeneous solution of vitamin A 3,7-diol acetal, hydrogen chloride, water and a solvent comprising chloroform wherein the solvent is in substantial excess over the weight of vitamin A 3,7-diol acetal and the hydrogen chloride amounts to at least about 0.2% of the weight of said vitamin A 3,7-diol acetal, and heating the solution to an elevated temperature below 200° C. for a time sufficient to effect conversion of a substantial portion of said vitamin A 3,7-diol acetal to vitamin A aldehyde by concomitant and correlated hydrolysis and dehydration, the reactants and the reaction products being soluble in said solvent during the reaction.

References Cited in the file of this patent

UNITED STATES PATENTS

| | | |
|---|---|---|
| 2,676,988 | Robeson et al. | Apr. 27, 1954 |
| 2,676,991 | Guntrum et al. | Apr. 27, 1954 |

FOREIGN PATENTS

| | | |
|---|---|---|
| 672,164 | Great Britain | May 14, 1952 |